US012466704B2

(12) United States Patent
Subramanian et al.

(10) Patent No.: US 12,466,704 B2
(45) Date of Patent: Nov. 11, 2025

(54) HOMING LOAD DETECTING DEVICE FOR RESCUE HOIST AND WINCH ASSEMBLIES

(71) Applicant: Hornet AcquisitionCo, LLC, Vancouver, WA (US)

(72) Inventors: Sanith Kurumpilavu Subramanian, Bangalore (IN); Nagesh Sadashivaiah, Bangalore (IN); Robert A. Blaser, Phoenix, AZ (US); Arthur A. Martinez, Chino Hills, CA (US)

(73) Assignee: HORNET ACQUISITIONCO, LLC, Vancouver, WA (US)

( * ) Notice: Subject to any disclaimer, the term of this patent is extended or adjusted under 35 U.S.C. 154(b) by 346 days.

(21) Appl. No.: 18/119,524

(22) Filed: Mar. 9, 2023

(65) Prior Publication Data
US 2024/0158211 A1 May 16, 2024

(30) Foreign Application Priority Data
Nov. 14, 2022 (IN) .............................. 202211065152

(51) Int. Cl.
B66D 3/00 (2006.01)
B64D 1/22 (2006.01)
B66D 3/20 (2006.01)
B66D 3/26 (2006.01)

(52) U.S. Cl.
CPC ................. B66D 3/26 (2013.01); B64D 1/22 (2013.01); B66D 3/20 (2013.01); B66D 2700/025 (2013.01)

(58) Field of Classification Search
CPC .......... B66D 1/485; B66D 1/505; B66D 1/56; B66D 1/60; B66D 3/20; B66D 3/24; B66D 3/26; B66D 2700/025; B64D 1/22
See application file for complete search history.

(56) References Cited

U.S. PATENT DOCUMENTS

| 3,565,402 A | * | 2/1971 | Linke | B66D 1/56 254/362 |
| 5,988,596 A | * | 11/1999 | Mitchell | B66D 1/36 254/277 |
| 7,410,150 B1 | * | 8/2008 | Falls | B66D 1/56 248/329 |

(Continued)

FOREIGN PATENT DOCUMENTS

CA 2933968 C * 9/2023 ............. B64C 27/04

OTHER PUBLICATIONS

Extended European Search Report dated Apr. 17, 2024; European Application No. 23209723.8.

Primary Examiner — Emmanuel M Marcelo
(74) Attorney, Agent, or Firm — SNELL & WILMER L.L.P.

(57) ABSTRACT

A fixture is described. The fixture is for detecting forces between a hook assembly and a bell mouth of a rescue hoist. The fixture couples to the bell mouth such that the fixture is affixed to a main housing of the rescue hoist. A cable of the rescue hoist extends through the bell mouth and the fixture. The cable includes a distal end coupled to the hook assembly. The cable is retractable causing the hook assembly to abut the fixture. The fixture may then detect the force. The force may be used to provide an indication to a crew of an aircraft that the force is below a minimum homing load or above a maximum homing load.

20 Claims, 11 Drawing Sheets

(56) References Cited

U.S. PATENT DOCUMENTS

| | | |
|---|---|---|
| 9,828,220 B2 | 11/2017 | Lopes et al. |
| 10,023,312 B2 | 7/2018 | Repp et al. |
| 10,252,894 B2* | 4/2019 | Humble ................ B64D 25/00 |
| 10,422,707 B2* | 9/2019 | Bradford ............... B25J 13/085 |
| 10,647,556 B2 | 5/2020 | Maghsoodi |
| 10,654,695 B1 | 5/2020 | Lopes et al. |
| 10,696,527 B2 | 6/2020 | Ijadi-Maghsoodi |
| 10,858,104 B2 | 12/2020 | Maghsoodi et al. |
| 10,947,094 B2 | 3/2021 | Maghsoodi |
| 11,254,549 B2 | 2/2022 | Maghsoodi et al. |
| 11,401,136 B2* | 8/2022 | Lopes ..................... B66D 1/28 |
| 2005/0120809 A1* | 6/2005 | Ramming ............. G01L 5/1627 <br> 73/862.044 |
| 2015/0185094 A1* | 7/2015 | Kohler .................... G01L 1/16 <br> 73/774 |
| 2017/0205296 A1* | 7/2017 | Bradford ............... G01L 5/1627 |
| 2017/0211999 A1* | 7/2017 | Bradford ............... B25J 13/085 |
| 2019/0107445 A1 | 4/2019 | Bradbury et al. |
| 2020/0017217 A1* | 1/2020 | Maghsoodi ............ G01B 21/32 |
| 2021/0017000 A1* | 1/2021 | Sikora .................... B66C 13/46 |
| 2021/0139291 A1* | 5/2021 | Iyer ......................... B66C 1/34 |
| 2021/0197970 A1 | 7/2021 | Azeredo et al. |
| 2022/0315397 A1 | 10/2022 | Azeredo et al. |

* cited by examiner

101

HOMING LOAD DETECTING DEVICE FOR RESCUE HOIST AND WINCH ASSEMBLIES

CROSS-REFERENCE TO RELATED APPLICATIONS

The present application claims the benefit of India Provisional Patent Application 202211065152, filed Nov. 14, 2022, titled "HOMING LOAD DETECTING DEVICE FOR RESCUE HOIST AND WINCH ASSEMBLIES", naming Sanith Kurumpilavu Subramanian et al. as inventors, with a DAS code of 4D9A, which is incorporated herein by reference in the entirety.

TECHNICAL FIELD

The present invention generally relates to hoists, and more specifically to rescue hoists having cable drums.

BACKGROUND

While performing hoisting operations there are instances when a crew of an aircraft commands a cable of a hoist to be reeled-in either too much or too little. The cable may be reeled-in too much (causing too much homing load) subjecting the cable to tensile stress and inducing a strain into the cable leading to potential cable damage. The potential cable damage due to too much tensile strain may include breakage of cable strands, plastic deformation of cable, bird-caging, and the like. The cable may also be incompletely reeled-in such that a portion of the cable is loose or slack. The slack in the cable may lead to bending of the cable and/or fatigue failure of the cable due to the bending. Therefore, it would be advantageous to provide a device, system, and method that cures the shortcomings described above.

SUMMARY

A fixture is described, in accordance with one or more embodiments of the present disclosure. In some embodiments, the fixture includes a surface. In some embodiments, the fixture includes a cylindrical wall extending from the surface the cylindrical wall is configured to receive at least a portion of a bell mouth of a rescue hoist. In some embodiments, the fixture includes a body portion extending from the surface and disposed within the cylindrical wall. In some embodiments, the fixture includes a sensor configured to detect a force and generate a signal indicative of the force. In some embodiments, the surface and the body portion define a through hole. In some embodiments, a cable of the rescue hoist is configured to extend through the through hole when the fixture is coupled to the bell mouth. In some embodiments, the body portion abuts the bell mouth when the fixture is coupled to the bell mouth.

A rescue hoist is described, in accordance with one or more embodiments of the present disclosure. In some embodiments, the rescue hoist includes a motor configured to drive a cable drum of the rescue hoist. In some embodiments, the rescue hoist includes a cable disposed on the cable drum. In some embodiments, an end of the cable extends through a bell mouth of the rescue hoist. In some embodiments, the rescue hoist includes a hook assembly disposed on the end of the cable. In some embodiments, the rescue hoist includes a fixture coupled to the bell mouth. In some embodiments, the hook assembly abuts the fixture when the hook assembly is in a homed position. In some embodiments, the fixture includes a surface. In some embodiments, the fixture includes a cylindrical wall extending from the surface. In some embodiments, at least a portion of the bell mouth is disposed within the cylindrical wall. In some embodiments, the fixture includes a body portion extending from the surface and disposed within the cylindrical wall. In some embodiments, the bell mouth abuts the body portion. In some embodiments, the fixture includes a sensor configured to detect a force between the bell mouth and the hook assembly and generate a signal indicative of the force. In some embodiments, the surface and the body portion define a through hole. In some embodiments, the cable extends through the through hole.

A system is disclosure, in accordance with one or more embodiments of the present disclosure. In some embodiments, the system includes an aircraft. In some embodiments, the aircraft includes a cockpit panel. In some embodiments, the system includes a rescue hoist coupled to the aircraft. In some embodiments, the rescue hoist includes a motor configured to drive a cable drum of the rescue hoist. In some embodiments, the rescue hoist includes a cable disposed on the cable drum. In some embodiments, an end of the cable extends through a bell mouth of the rescue hoist. In some embodiments, the rescue hoist includes a hook assembly disposed on the end of the cable. In some embodiments, the rescue hoist includes a fixture coupled to the bell mouth. In some embodiments, the hook assembly abuts the fixture when the hook assembly is in a homed position. In some embodiments, the fixture includes a surface. In some embodiments, the fixture includes a cylindrical wall extending from the surface. In some embodiments, at least a portion of the bell mouth is disposed within the cylindrical wall. In some embodiments, the fixture includes a body portion extending from the surface and disposed within the cylindrical wall. In some embodiments, the bell mouth abuts the body portion. In some embodiments, the fixture includes a sensor configured to detect a force between the bell mouth and the hook assembly and generate a signal indicative of the force. In some embodiments, the surface and the body portion define a through hole. In some embodiments, the cable extends through the through hole.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
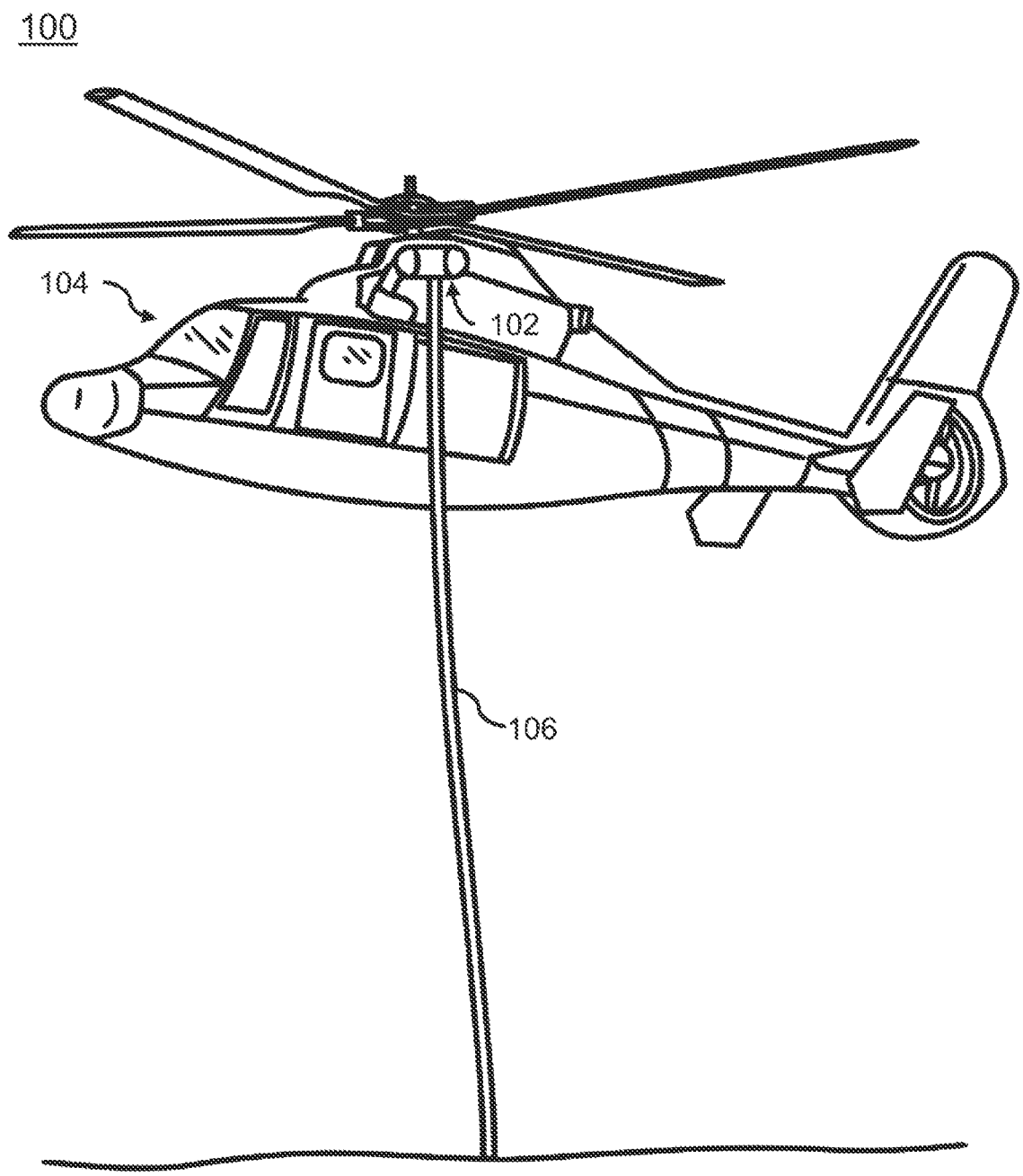
FIG. 1A depicts a perspective view of a system including an aircraft and a rescue hoist, in accordance with one or more embodiments of the present disclosure.
Figure 1B:
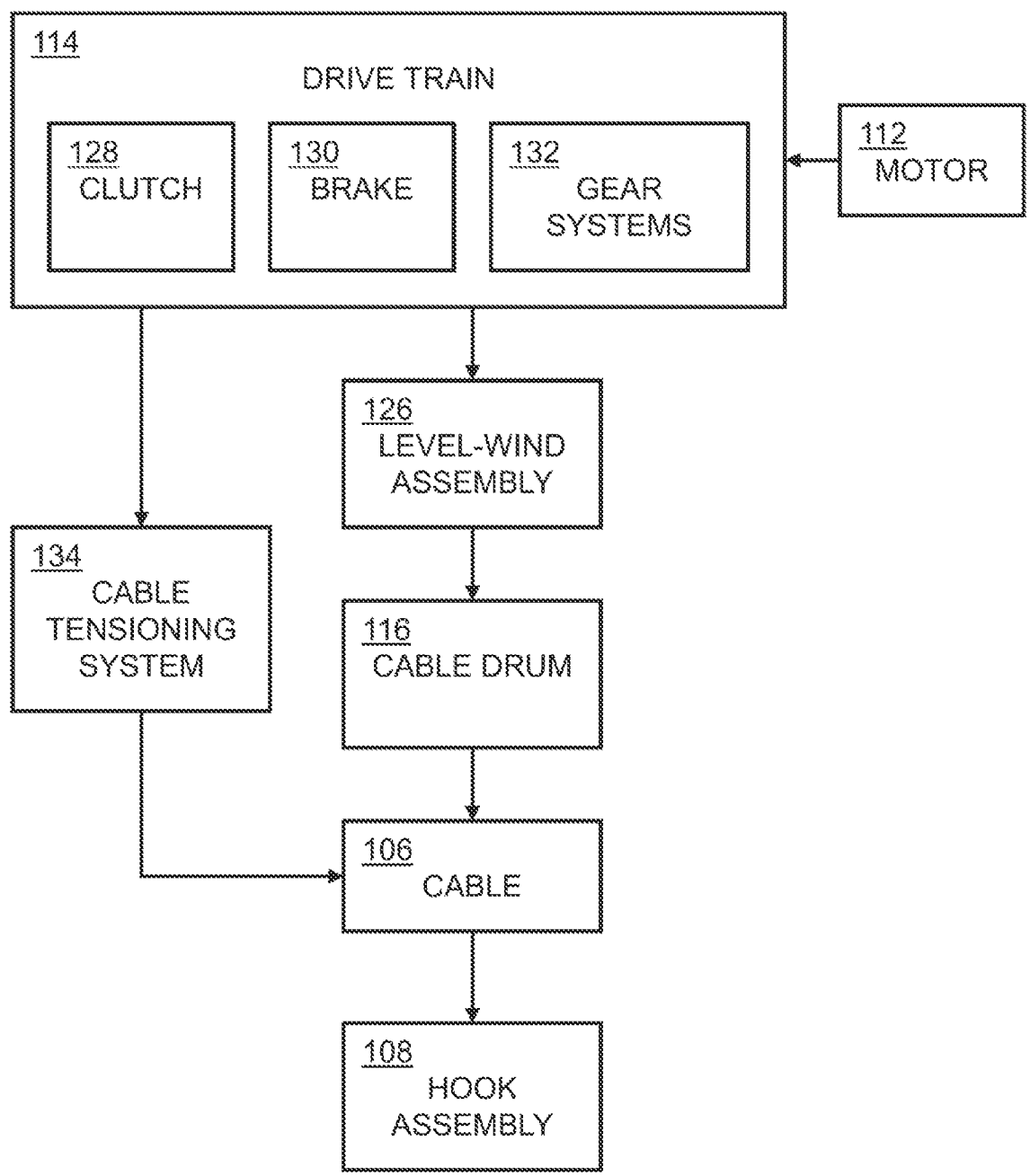
FIG. 1B depicts a simplified block diagram of a rescue hoist, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a fixture for the rescue hoist. The fixture is affixed to a bell mouth of the rescue hoist. The fixture includes embedded pressure or force sensors such as load cells, piezoelectric sensors, and the like. The force sensors measure the magnitude of force exerted by a hook assembly on the fixture. The fixture then communicates the force data to the crew by a light, an audio transducer, or a communication interface. The fixture may also communicate the force data to a motor controller of the rescue hoist. The fixture is advantageous to increase the safety of the rescue hoist system by detecting the homing load, such as the homing loads for the entire flight cycle.

U.S. Patent Publication No. US 2021/0139291A1, titled "Axial rotation damping mechanism", and filed on Jul. 23, 2020; U.S. Pat. No. 11,401,136, titled "Rescue hoist cable angle exceedance detection arrangement", and filed on Jul. 13, 2018; U.S. Pat. No. 11,254,549, titled "Hoist translating drum with bar spline bearing", and filed on Jun. 4, 2019; U.S. Pat. No. 10,947,094, titled "Auxiliary brake assembly", and filed on Aug. 5, 2019; U.S. Pat. No. 10,858,104, titled "Rescue hoist cable angle detection assembly", and filed on Jul. 3, 2018; U.S. Pat. No. 10,654,695, titled "Clutch assembly for detecting and measuring slip using proximity sensors", and filed on Nov. 21, 2018; U.S. Pat. No. 10,696,527, titled "Hoist drive train torque sensor", and filed on Jul. 2, 2018; U.S. Pat. No. 10,647,556, titled "Hoist cable sensor with differential drive", and filed on Oct. 2, 2018; and U.S. Pat. No. 10,252,894, titled "Self-homing hoist", and filed on Jul. 10, 2017; are each incorporated herein by reference in the entirety.

Referring to FIG. 1A-1E, a system 100 is described, in accordance with one or more embodiments of the present disclosure. The system 100 may include a rescue hoist aircraft 102 and an aircraft 104. The rescue hoist 102 may also be referred to as a rescue hoist system (RHS). The rescue hoist 102 may be mounted to the aircraft 104. The rescue hoist 102 may include a cable 106, a hook assembly 108, a main housing 110, a motor 112, a drive train 114, a cable drum 116, a traction sheave 118, a bell mouth 120, a level-wind assembly 126, a cable tensioning system 134, and the like. The main housing 110 is attached to the aircraft 104 to secure the rescue hoist 102 to the aircraft 104.

The rescue hoist 102 may be operated and controlled electrically (or electronically) by a pendant and driven by the motor 112 and the drive train 114. The motor 112 is supported by the main housing 110. The power required to drive the motor 112 is taken from a power supply of the aircraft 104. The motor 112 generates the required torque to drive the drive train 114. The drive train 114 is driven by motor 112 and is connected, either directly or indirectly, such as through a gear system 132, to the cable drum 116. The drive train 114 provides power to cable drum 116 from the motor 112 to rotate the cable drum 116 about an axis of the cable drum 116. The drive train 114 may then cause rotation of the cable drum 116. In this regard, the motor 112 may be configured to drive the cable drum 116 of the rescue hoist 102.

In some embodiments, the drive train 114 may include a clutch assembly 128, a brake assembly 130, and/or a gear system 132. The gear system 132 may connect the drive train 114 to the cable drum 116. The gear system 132 multiplies the torque from the motor 112 based on the gear ratios either to increase or decrease the speed and proportionality the torque. The gear system 132 may include a parallel gear system, an epicyclic gear system, and the like. The brake assembly 130 may include one or more sub-assemblies, such as a multi-disc brake. The multi-disc brakes provide hold and release function and aid in friction compensation. The clutch assembly 128 may include a one-way clutch. The one-way clutch provides a locking function to hold the cable 106 in position and prevents un-intended lowering of attached load of the cable 106 in the event of power loss. The clutch assembly 128 provides friction compensation and allows a slippage in the event of entanglement of the cable 106 with the ground or when the load increases beyond a threshold value (e.g., 2.2 times the normal rated load).

The cable drum 116 is rotatably supported by the main housing 110. The rotation of the cable drum 116 may then raise and lower the cable 106 and the hook assembly 108. A proximal end of the cable 106 is attached to the cable drum 116. A portion of the cable 106 may be wound around the cable drum 116. In this regard, the cable 106 may be disposed on the cable drum 116. The cable 106 may then extend from the cable drum 116 through the traction sheave 118 and the bell mouth 120 of the rescue hoist 102. The traction sheave 118 creates and maintains a back tension on cable 106 to prevent fouling of cable 106 as cable 106 winds on and off of cable drum 116.

In some embodiments, the rescue hoist 102 may include a fixture 101. The fixture 101 may be coupled to the bell mouth 120. The dampener 122 of the hook assembly 108 may abut fixture 101 when the hook assembly 108 is in a homed position. The bell mouth 120 and/or the fixture 101 may provide a point for the cable 106 to exit the main housing 110. The bell mouth 120 may also be referred to as a cable guide. The distal end of cable 106 exits rescue hoist 102 through bell mouth 120 and the fixture 101.

A hook assembly 108 is disposed at a distal end of cable 106. The hook assembly 108 is attached to the distal end of cable 106. The hook assembly may include the dampener 122 and the hook 124. The dampener 122 may be attached to the cable 106. The dampener 122 may be compressible. The dampener 122 may be configured to elastically deform when abutting the fixture 101. The dampener 122 may also be referred to as a bumper, a damper, or a compressive cylinder. The hook 124 may extend from dampener 122. The hook 124 may be configured to attach to cargo to raise and lower the objects from aircraft 104. The rescue hoist 102 may be used for lifting or lowering the Human External Cargo (HEC) or Non-Human cargo (NHEC) by means of the hook 124.

Figure 1C:
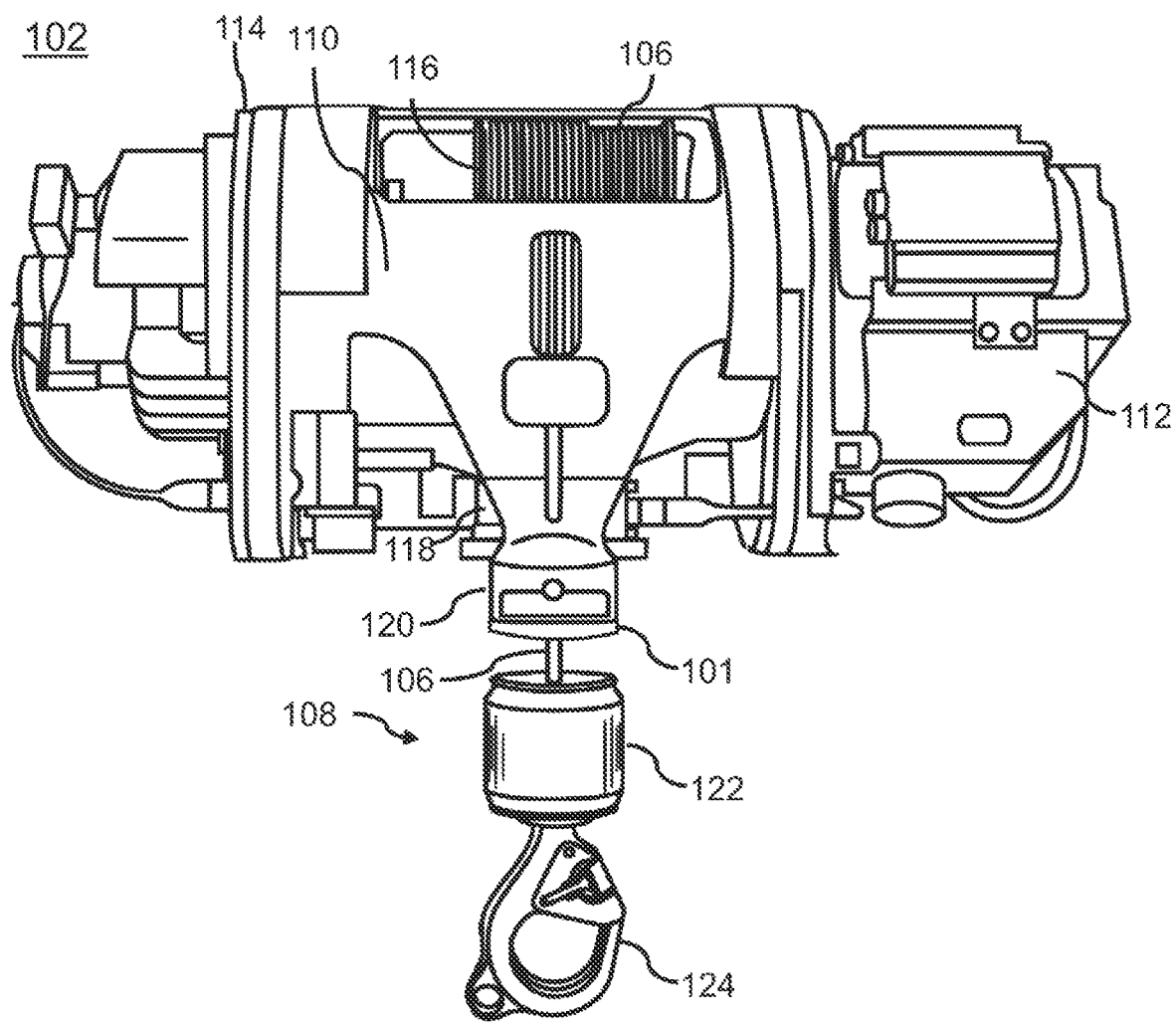
FIG. 1C depicts a front view of a rescue hoist with a hook assembly displaced from a homed position, in accordance with one or more embodiments of the present disclosure.

In FIG. 1C, the hook assembly 108 is shown displaced from a homed position. During operation, the hook assembly 108 is lowered from the homed position. The hook assembly 108 may be lowered to secure the hook 124 to a Human External Cargo or Non-Human cargo to be hoisted. The hook assembly 108 may then be raised to hoist the object. As and when the crew of the aircraft 104 cause the motor 112 to perform a reeling-in operation, the reeled-out cable starts to wind over the cable drum 116. The level-wind assembly 126 causes the cable 106 to translate in a reciprocating manner to-and-fro across the cable drum 116. The level-wind assembly may cause the cable 106 to uniformly wrap around the cable drum 116. The cable tensioning system 134 provides the required tension to the cable 106 during reeling-in and reeling-out to avoid potential mis-wrap of the cable 106 over the cable drum 116. The hook assembly 108 along with the Human External Cargo or Non-Human cargo is pulled up towards the aircraft 104. The hook assembly 108 may be pulled up to abut against the fixture 101.

Figure 1D:
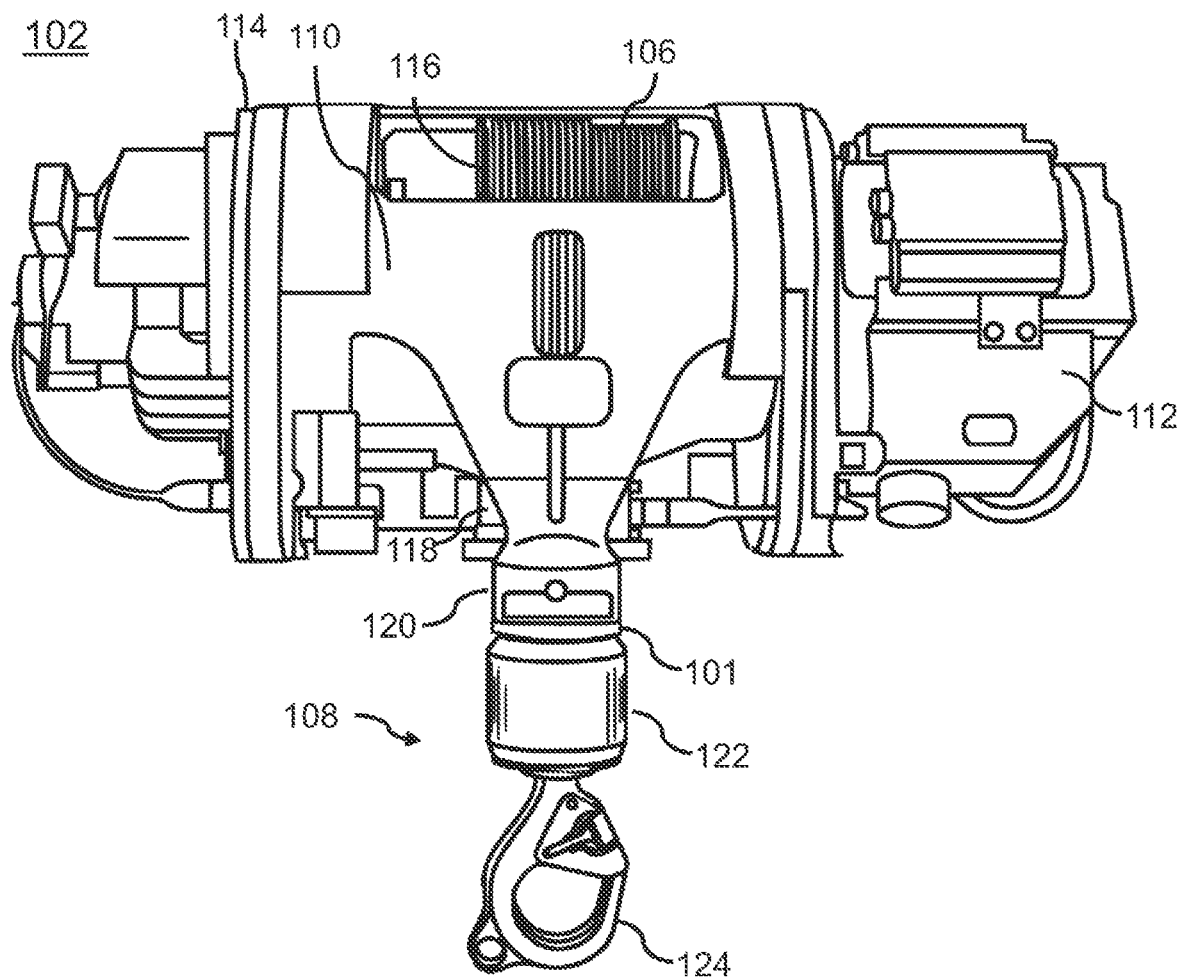
FIG. 1D depicts a front view of a rescue hoist with a hook assembly in a homed position, in accordance with one or more embodiments of the present disclosure.

In FIG. 1D, the hook assembly 108 is shown in the homed position, where dampener 122 abuts bell mouth 120. To home the hook assembly 108, the motor 112 causes the cable drum 116 to rotate for retracting the cable 106 and the hook assembly 108. The cable drum 116 is rotated until the dampener 122 abuts the fixture 101. With dampener 122 abutting the fixture 101, the motor 112 continues to rotate the cable drum 116 causing the dampener 122 to compress. The dampener 122 may compress until the cable 106 has a desired level of tension and/or until a desired level of force or homing load is between the dampener 122 and the fixture 101. With dampener 122 abutting the fixture 101 and the cable 106 in tension, the motor 112 is deactivated once the hook assembly 108 is in the homed position such that rescue hoist 102 is ready for transport. The hook assembly 108 may remain in the homed position when the rescue hoist 102 is not in operation. The tension in the cable 106 may then prevent various components (e.g., cable 106, cable drum 116, etc.) of the rescue hoist 102 from moving due to system vibrations, which can cause premature wear and damage to the components. In order to support safe transport flight, the cable 106 is homed or "stowed", such that the cable is neither over-tensioned nor overly-loosened.

Figure 1E:
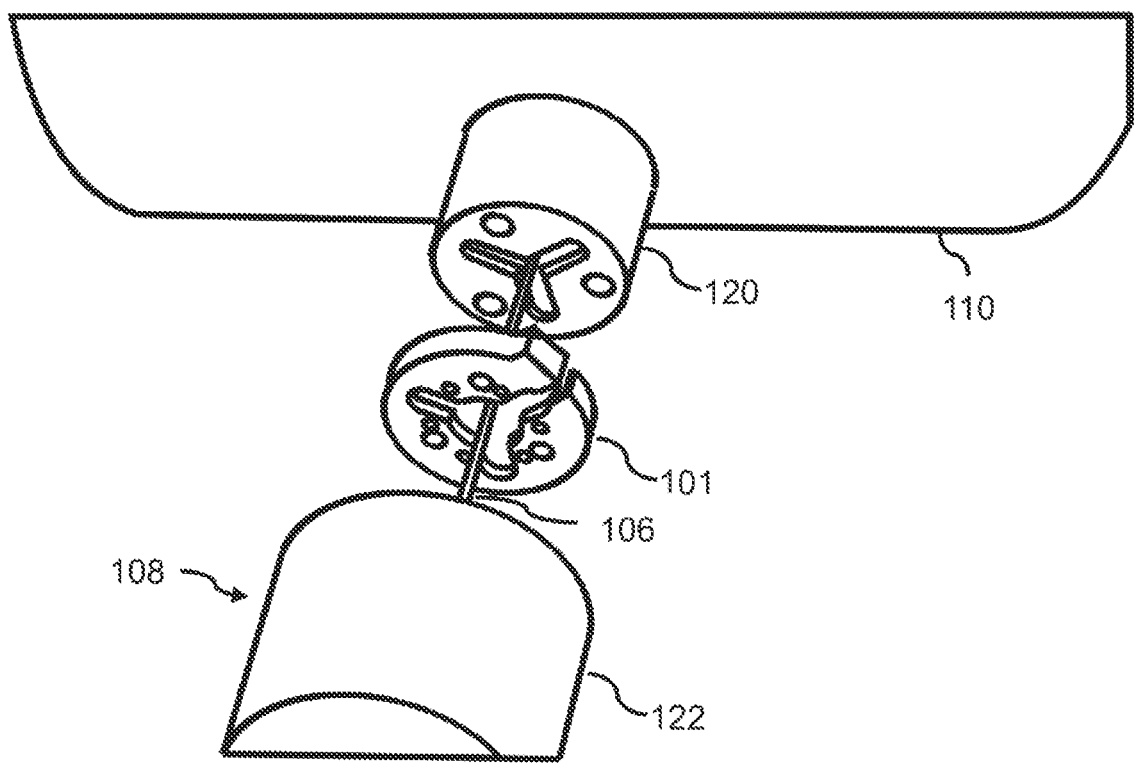
FIG. 1E depicts a partial exploded view of a rescue hoist, in accordance with one or more embodiments of the present disclosure.
Figure 2A:
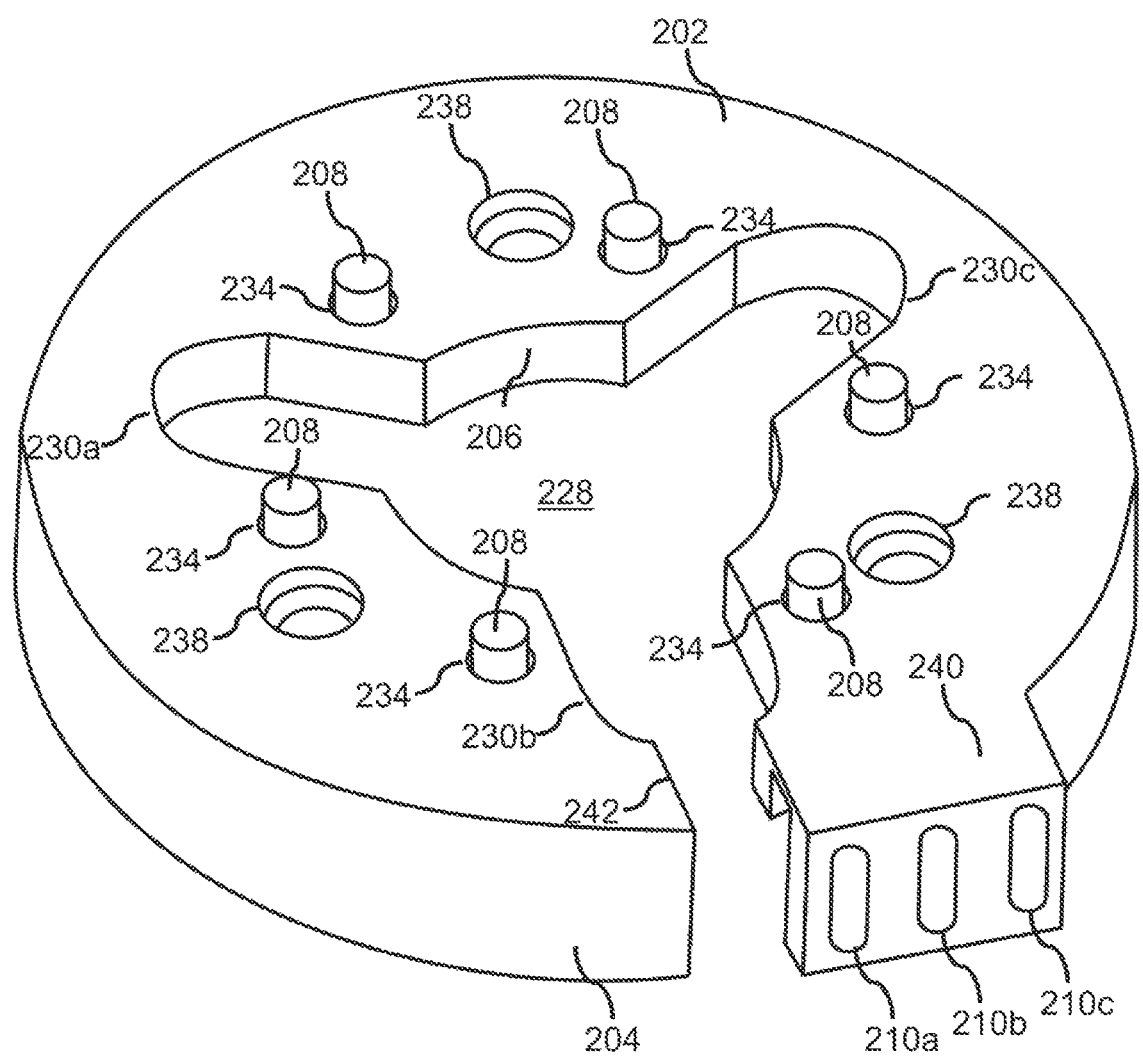
FIG. 2A depicts a bottom perspective view of a fixture for a rescue hoist, in accordance with one or more embodiments of the present disclosure.
Figure 2B:
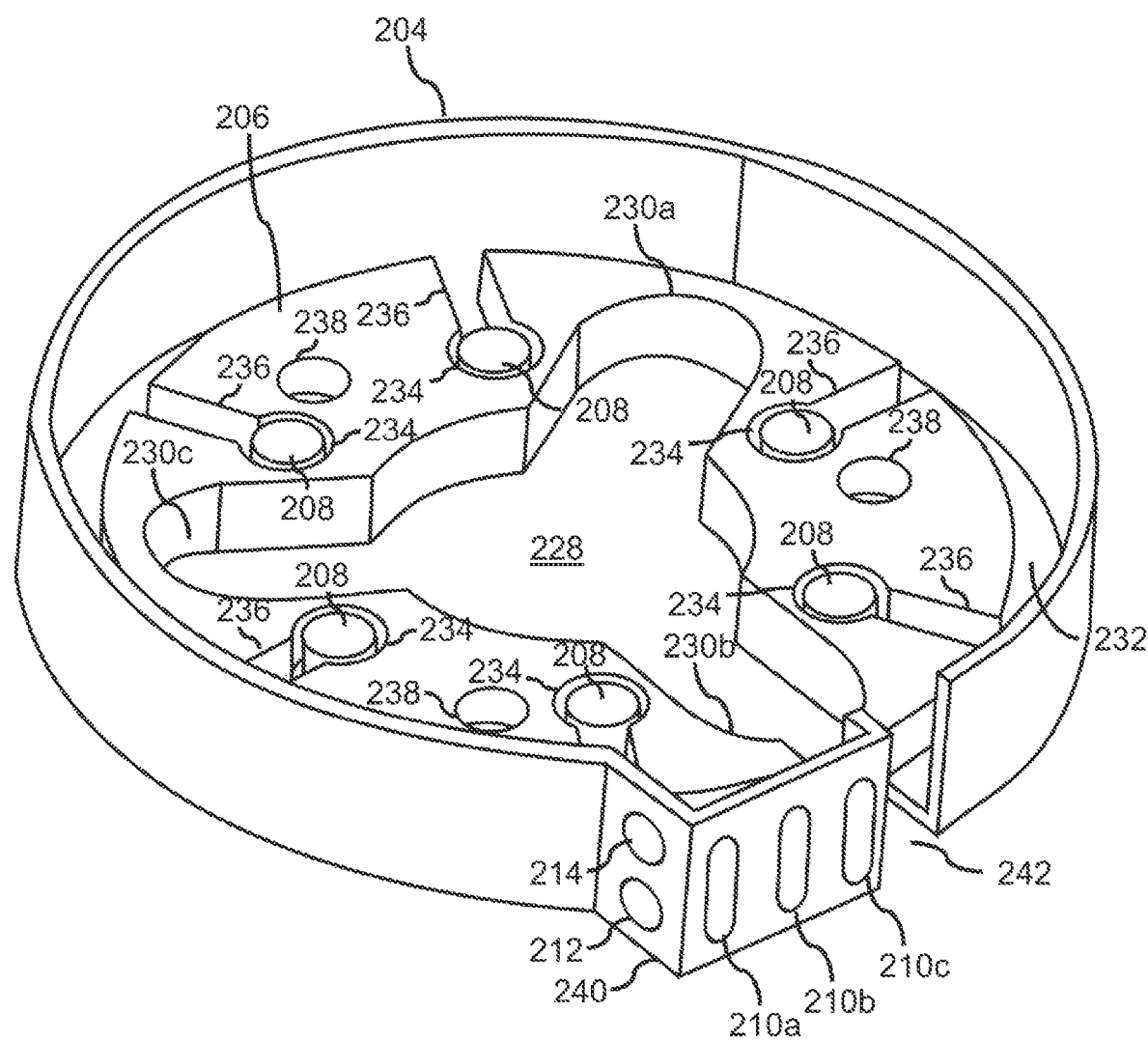
FIG. 2B depicts a top perspective view of a fixture for a rescue hoist, in accordance with one or more embodiments of the present disclosure.
Figure 2C:
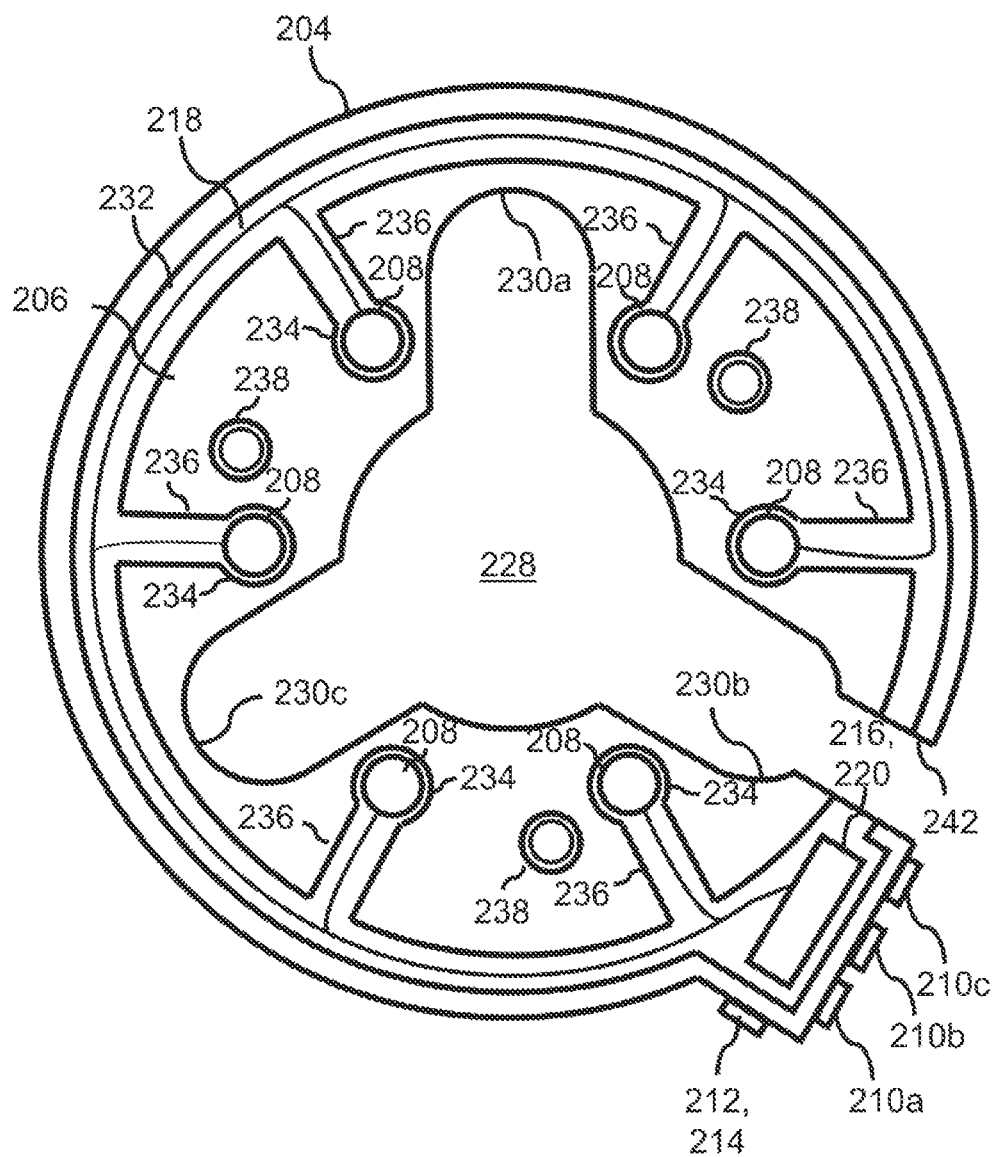
FIG. 2C depicts a top view of a fixture for a rescue hoist, in accordance with one or more embodiments of the present disclosure.
Figure 2D:
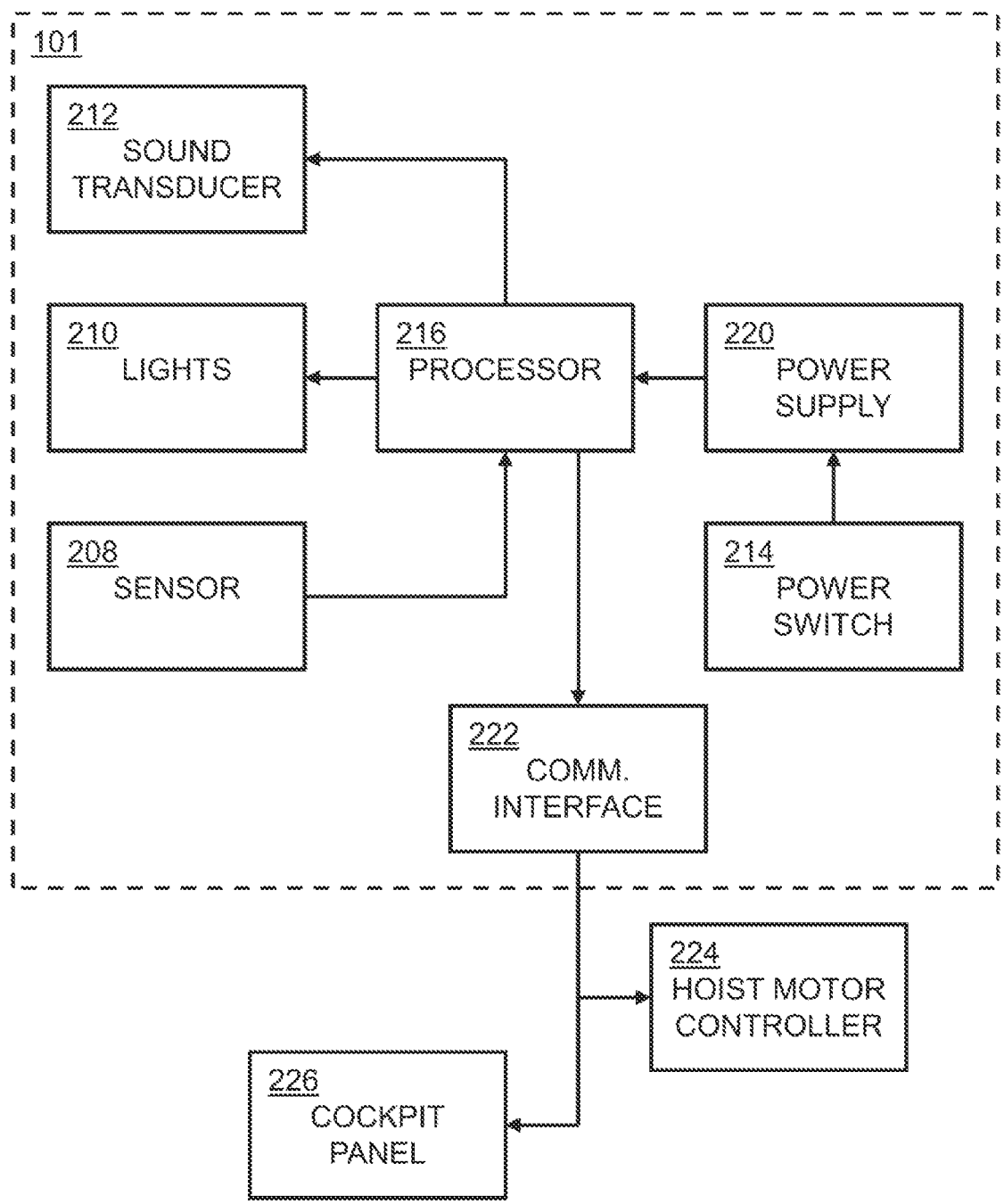
FIG. 2D depicts a simplified block diagram of a system including a fixture, in accordance with one or more embodiments of the present disclosure.

In FIG. 1E, the fixture 101 is shown decoupled from the bell mouth 120. The fixture may include an inner diameter configured to receive a portion of the bell mouth 120. The bell mouth 120 may be inserted into the fixture 101 and affixed by one or more fasteners. The fixture 101 may mount directly to the bell mouth 120. In some embodiments, the rescue hoist 102 may include one or more fasteners (not depicted) affixing the fixture 101 to the bell mouth 120. The fasteners may include any suitable type of fastener for fastening the fixture 101 to the bell mouth 120, such as, but not limited to, bolts, rivets, and the like. The fasteners may be flush mounted to the fixture 101, thereby preventing the fasteners from interfering with the dampener 122 when the hook assembly 108 abuts the fixture 101.

Referring now to FIGS. 2A-2D, the fixture 101 is described, in accordance with one or more embodiments of the present disclosure. The fixture 101 may include one or more of a surface 202, a cylindrical wall 204, a body portion 206, sensors 208, lights 210, a sound transducer 212, a power switch 214, a processor 216, wires 218, power supply 220, communication interface 222, a cuboid wall 240, and the like.

In some embodiments, the fixture 101 may include the surface 202. The surface 202 may be a substantially flat surface or planar surface. The surface 202 may also be referred to as a face of the fixture 101. The surface 202 abuts the dampener 122 when the hook assembly 108 is in the homed position. For example, a bottom of the surface 202 abuts the dampener 122. The surface 202 may include a perimeter. In some instances, the perimeter of the surface 202 may be completely cylindrical such that the perimeter of the surface 202 may also be referred to as an outer diameter. As depicted, the perimeter of the surface 202 is not perfectly cylindrical but includes a rectangular portion at an end. The rectangular portion may be provided for extending the cuboid wall 240 from the surface 202.

In some embodiments, the fixture 101 may include the cylindrical wall 204. The cylindrical wall 204 may be a wall forming a cylindrical shape. The cylindrical wall 204 may extend from the surface 202. For example, the cylindrical wall 204 may extend from a top of the surface 202. The cylindrical wall 204 may then extend upwards from the perimeter of the surface 202. The cylindrical wall is configured to receive at least a portion of the bell mouth 120 of the rescue hoist 102. At least a portion of the bell mouth 120 may disposed within the cylindrical wall 204 when the fixture 101 is coupled to the bell mouth 120. In this regard, an inner diameter of the fixture 101 may be defined by the inside of the cylindrical wall 204. The bell mouth 120 may be inserted into the cylindrical wall 204 and affixed to the fixture 101 by one or more fasteners (not depicted).

In some embodiments, the fixture 101 may include the body portion 206. The body portion 206 may extend from the surface 202. The body portion 206 may also be disposed within the cylindrical wall 204. The body portion 206 may then be used to define one or more structural features of the fixture 101 as will be described herein. The bell mouth 120 may abuts the body portion 206 when the fixture 101 is coupled to the bell mouth 120.

In some embodiments, the fixture 101 may include a cuboid wall 240. The cuboid wall 240 may be a wall forming a cuboid shape. The cuboid wall 240 may extend from the surface 202. The cuboid wall 240 may also extend from one end of the cylindrical wall 204. The cuboid wall 240 may define one or more recesses. The cuboid wall 240 may be configured to receive one or more of the lights 210, the sound transducer 212, the power switch 214, the processor 216, the power supply 220, and/or the communication interface 222 in the one or more recesses. The cuboid wall 240 may allow the fixture 101 to include the processor 216 without the processor 216 interfering with the bell mouth 120 when the fixture 101 is coupled to the bell mouth 120.

In some embodiments, the surface 202, the cylindrical wall 204, the body portion 206, and/or the cuboid wall 240 may extend from the surface 202 by forming a single unit or assembly. For example, the surface 202, the cylindrical wall 204, the body portion 206, and/or the cuboid wall 240 may be injection molded as the unit. By way of another example, the surface 202, the cylindrical wall 204, the body portion 206, and/or the cuboid wall 240 may be milled to form the unit. By way of another example, the surface 202, the cylindrical wall 204, the body portion 206, and/or the cuboid wall 240 may be fastened together or adhered together to form the assembly.

In some embodiments, the fixture 101 may include a through hole 228. The surface 202 and the body portion 206 define the through hole 228. The cable 106 may extend through the through hole 228 when the fixture 101 is coupled to the bell mouth 120. The through hole 228 may be a circular through hole. In some embodiments, the through hole 228 may be concentric to an axis of the cylindrical wall 204. The axis of the cylindrical wall 204 refers to the central axis of a cylinder defined by the cylindrical wall 204.

In some embodiments, the fixture 101 may include one or more slotted through holes 230. The surface 202 and the body portion 206 may define the slotted through holes 230. The term slotted through hole may refer to a slotted hole which is through the surface 202 and the body portion 206. The slotted through holes 230 may extend radially outward from the axis of the cylindrical wall and/or from the through hole 228. Extending radially outward may refer to forming a line which may extend outward from a center of the cylindrical wall 204 towards the cylindrical wall 204.

For example, the surface 202 and the body portion 206 may define a first slotted through hole 230a, a second slotted through hole 230b, and a third slotted through hole 230c. The first slotted through hole 230a, the second slotted through hole 230b, and the third slotted through hole 230c may each extend radially outward from the axis of the cylindrical wall 204. The first slotted through hole 230a, the second slotted through hole 230b, and the third slotted through hole 230c are arranged at a one-hundred-and-twenty-degree angle relative to each other. In this regard, the first slotted through hole 230a, the second slotted through hole 230b, and the third slotted through hole 230c may define a Y-shape. The body portion 206 may be considered to include three sectors or trines which are separated by the first slotted through hole 230a, the second slotted through hole 230b, and the third slotted through hole 230c.

The slotted through holes 230 may be include a length which is less than an outer radius of the body portion 206. The slotted through holes 230 may then be contained within the outer radius or perimeter of the body portion 206. In this regard, the body portion 206 may provide a stop for the cable 106 when the cable 106 is disposed in the slotted through hole 230. The slotted through holes 230 may advantageously allow the cable 106 to swing along the slotted through holes 230 up to the body portion 206.

The through hole 228 and/or the slotted through holes 230 may protect the cable 106 from interfacing with a hard edge as the cable 106 extends and retracts from the main housing 110. Preventing the cable from interfacing with the hard edge may be advantageous to reduce stress in the cable 106 due to rubbing or scraping of the cable on the fixture 101.

In some embodiments, the fixture 101 may include a groove 232. The groove 232 may be defined by the surface 202, the cylindrical wall 204, and the body portion 206. The groove 232 may be disposed between an outer diameter of the body portion 206 and an inner diameter of the cylindrical wall 204. As depicted, the groove 232 may be disposed around the outer diameter of the of the body portion 206. In this regard, the groove 232 may be considered to encircle the body portion 206. The wires 218 may then be disposed in the groove 232 and couple the sensors 208 to the processor 216. The arrangement of the wires 218 in the groove 232 may be advantageous for preventing the wires from being pinched between the body portion 206 and the bell mouth 120 when the fixture 101 is coupled to the bell mouth 120.

In some embodiments, the fixture 101 may include one or more counter bores 234. The counter bores 234 may be provided through the surface 202 and the body portion 206. The counter bores 234 may include a first depth with a first diameter and a second depth with a second diameter, where the first diameter is larger than the second diameter. The first depth of the counter bores 234 may start from and extend through the body portion 206 up to the surface 202. The second depth of the counter bores 234 may start from the first depth and extend through the surface 202. In this regard, the counter bores 234 may expose the surface 202. The sensors 208 may then be disposed within the counter bores 234. The sensors 208 may be coupled on the surface 202. The sensors 208 may form a flush surface with the body portion 206. Flush may refer to substantially level or an unbroken surface. Providing the flush surface may be advantageous to prevent the sensors 208 from extending beyond the body portion 206 and allow the sensors 208 to abut with the bell mouth 120. In this regard, the sensors 208 may transmit a force between the dampener 122 and the bell mouth 120 for measuring the force. Additionally, the counter bores 234 may be advantageous for ease-of-assembly. Although the fixture 101 is described as including the counter bores 234 for the sensors 208, this is not intended as a limitation of the present disclosure. It is further contemplated that the sensors 208 may be coupled to one or more blind holes (not depicted) of the surface 202 which abuts with dampener 122 such that the sensors 208 may detect the force. However, the placement of the sensors 208 which is depicted advantageously prevents the wires from being pinched between the fixture 101 and the dampener 122.

In some embodiments, the fixture 101 may include one or more blind slotted holes 236. The term blind slotted hole may refer to a slotted hole which is blind or a non-through hole. The body portion 206 may defines the blind slotted holes 236. For example, the blind slotted holes 236 may be defined up to the surface 202, although this is not intended to be limiting. The blind slotted holes 236 may extend radially outward from the sensors 208 and/or the counter bore 234 up to the groove 232. The wires 218 may then be disposed within the blind slotted hole 236 and the groove 232. The wires may then couple the sensors 208 to the processor 216. Each of the sensors 208 and counter bores 234 may include one of the blind slotted holes 236 connecting to the groove 232. The combination of the groove 232 and the blind slotted holes 236 may allow for routing the wires 218 from the sensors 208 to the processor 216 around the body portion 206.

In some embodiments, the fixture 101 may include a rectangular slot 242. The surface 202, the cylindrical wall 204, the body portion 206, and/or the cuboid wall 240 may define the rectangular slot 242. The rectangular slot 242 may be from the outer diameter of the cylindrical wall 204 up to one of the slotted through holes 230 (e.g., the slotted through holes 230b as depicted). The rectangular slot 242 may allow the cable 106 to be inserted into and/or removed from the fixture 101. The ability to allow the cable 106 to be inserted into and/or removed from the fixture 101 may be advantageous for ease-of-assembly. The fixture 101 may be added to the bell mouth 120 after the cable 106 is inserted through the bell mouth 120 without having to remove the hook assembly 108 from the distal end of the cable 106. For example, the cable 106 may be slid through the rectangular slot 242 and the slotted through hole 230b and then extend through the fixture 101 by way of the through hole 228. The rectangular slot 242 may be covered by a rectangular slot cover (not shown). The rectangular slot cover may restrict undesired movement of the cable through the rectangular slot 242 after the fixture 101 is placed onto the cable 106.

In some embodiments, the fixture 101 may include one or more holes 238. The holes 238 may receive the fasteners which affix the fixture 101 to the bell mouth 120. The holes 238 may include, but are not limited to, through holes, counter bores, counter sinks, and the like. As depicted, the fixture 101 includes three of the holes 238. The fixture 101 may then include one of the three holes in each sector of the body portion 206 (e.g., one of the holes between each of the slotted through holes 230).

In some embodiments, the fixture 101 may include one or more of the sensors 208. The sensor 208 may also be referred to as force sensors. The force sensor may be a transducer that converts an input mechanical load, weight, tension, compression, or pressure into an electrical output signal. The sensors 208 may be mounted to the surface 202 and/or the body portion 206 of the fixture 101. The sensors 208 may be disposed in the counter bores 234. The sensors 208 may project outward from the surface 202 through the second depth of the counter bores 234. The sensors 208 may be configured to detect a force. The sensors may also generate a signal indicative of the force. In some instances, the signal may be indicative of the magnitude of the force. The signal may include, but is not limited to, an analog signal or a digital signal. The sensors 208 may include any type of sensor suitable for detecting forces and generating signals indicative of the forces, such as, but not limited to, pressure sensors, force sensors, load cell, piezo-electric sensors, capacitive load cells, strain gauge load cells, and the like. As depicted, the fixture 101 may include six of the sensors 208 and similarly six of counter bores 234 and six of the blind slotted holes 236 for the sensors 208. The fixture 101 may then include two of the sensors 208 in each sector of the body portion 206 (e.g., two of the sensors 208 between each of the slotted through holes 230).

The force may be between the bell mouth 120 and the hook assembly 108. In particular, the sensors 208 may detect a force exerted on the sensors 208 by the dampener 122 of the hook assembly 108 when the dampener 122 abuts the fixture 101. In this regard, the sensor 208 may be configured to detect the force between the bell mouth 120 and the hook assembly 108. In some embodiments, the force may be indicative of the tension in the cable 108. In this regard, the tension in the cable 108 may increase with the force. If the cable 108 is over stressed due to continued reeling-in or under stressed due to incomplete reeling-in, the cable 108 may undergo damage. Therefore, the ability to detect the force may be advantageous to detect whether the cable 108 is over stressed or under stressed. The force may also be referred to as a homing load. The homing load may be zero when the hook assembly 108 does not abut the fixture 101. The hook assembly may cycle back and forth due to the vibration of the aircraft when the homing load is zero. In this regard, the hook assembly 108 may be unsecured. The vibration of the hook assembly 108 may undesirably stress the cable 106. The force may be zero until the dampener 122 abuts the fixture 101. Once the dampener 122 abuts the fixture 101 the force detected by the sensors 208 may increase above zero.

In some embodiments, the rescue hoist 102 may include rated tensions at which the cable 106 should be homed. The rated tensions may be used to determine thresholds for the force detected by the sensors 208. The thresholds may include a first threshold or a lower threshold, and a second threshold or an upper threshold. The first threshold may be greater than zero. The first threshold may indicate a homing load of the hook assembly 108 is too low. The second threshold may be greater than the first threshold. The second threshold may indicate the homing load of the hook assembly 108 is too high. The specific values for the first threshold and the second threshold are not intended to be limiting.

In some embodiments, the fixture 101 includes the processor 216. The processor 216 may also be referred to as a processor card, a printed circuit board (PCB), and the like. The processor 216 may be disposed within and/or coupled to one or more components of the fixture 101. For example, the processor 216 may be disposed within the cuboid wall 240.

The processor 216 may be coupled to the sensors 208. The signals from the sensors 208 may be provided to the processor 216. The processor 216 may receive the force measurements from the sensors 208 by the coupling. The coupling may include, but is not limited to, the wires 218. The wires 218 may include any wireline coupling. The wires 218 may be routed between the sensors 208 and the processor 216. In some embodiments, the wires 218 may be disposed within the blind slotted holes 236 and the groove 232. The wires 218 may then couple the sensors 208 to the processor 216 by which the processor 216 is configured to receive the signal indicative of the force.

The processor 216 may be configured to execute one or more program instructions maintained on memory. The program instructions may cause the processor 216 to detect one or more status and selectively engage the lights 210 and/or the sound transducer 212 based on the signal received from the sensors 208. In some embodiments, the processor 216 may detect one or more statuses based on the force measurement. In some embodiments, the processor 216 may compare the signal indicative of the force against a pre-defined data (i.e., look-up table). The processor 216 may also detect the dampener 122 abuts the fixture 101 when the force is greater than zero. In this regard, the processor 216 may detect when the hook assembly 108 arrives at the fixture 101.

The status may include, but is not limited to, a force below a first threshold, force between the first threshold and a second threshold, and/or force above the second threshold. The first threshold may indicate that there is too little pressure or force than required to achieve a desired tension in the cable 106. The second threshold may indicate that there is too much pressure or force than required to achieve a desired tension in the cable 106. Being between the first and the second threshold may indicate the pressure or force applied is within required limits for the tension of the cable 106. Advantageously, the fixture 101 may detect too much force indicating the homing load is above the second threshold. The homing load being above the second threshold may cause increased tensile stress in the cable leading to potential cable damage. Similarly, the fixture 101 may detect too little force indicating the homing load is below the first threshold. The homing load being below the first threshold may indicate insufficient tension in the cable 106 which may lead sagging and/or swinging in the cable 106.

In some embodiments, the processors 216 are configured to execute one or more program instructions for remediating the over tension or under tension of the cable 108 thereby preventing damage to the cable 108. In some embodiments, the processor 216 may engage the lights 210 and/or the sound transducer in response to detecting the force is below the first threshold or above the second threshold. In this regard, the lights and the sound transducer may annunciate the status for alerting a crew of the aircraft 104 that the homing load of the hook assembly 108 is one of too low or too high. In some embodiments, the processor 216 may communicate the force to the hoist motor controller 224 causing the hoist motor controller 224 to control the motor 112, thereby adjusting the force. In some embodiments, the processor 216 communicate the force to the cockpit panel 226, causing the cockpit panel 226 to display a warning to the crew of the aircraft 104.

In some embodiments, the fixture 101 may include the lights 210. The lights 210 may be engaged by illuminating the lights 210. The lights 210 may include any light configured to be illuminated, such as, but not limited to, a light emitting diode (LED) and the like. The lights 210 may be coupled to the processor 216. The processor 216 may selectively illuminate the lights 210. The illumination of the lights 210 may indicate the status of the fixture 101. In this regard, the lights may be referred to as status display lights. The lights 210 may then provide a visual means of indicating the hook assembly 108 is properly homed. The lights 210 may be disposed on a side of the fixture 101. In this regard, the lights 210 may be visible when the hook assembly 108 abuts the fixture 101. In some embodiments, the lights 210 may be coupled to the cuboid wall 240.

In some embodiments, the lights 210 may include a first light 210a, a second light 210b, and a third light 210c. The processor 216 may cause the first light 210a to illuminate when the force is below the first threshold, cause the second light 210b to illuminate when the force is between the first threshold and the second threshold, and cause the third light 210c to illuminate when the force is above the second threshold. The three lights may then be used by the crew to visually differentiate between the three statuses and/or indicate too much homing load, too little homing load, or homing load within the defined range.

In some embodiments, the fixture 101 may include the sound transducer 212. The sound transducer 212 may be engaged to generate a sound. The sound transducer 212 may include any transducer configured to generate the sound, such as, but not limited to, a buzzer, a beeper, a speaker, a piezoelectric transducer, and the like. The sound transducer 212 may be coupled to the processor 216. The processor 216 may cause the sound transducer 212 to generate the sound when the force is below the first threshold and/or when the force is above the second threshold. In this regard, the sound transducer 212 may provide an audio cue to alert the crew of the aircraft 104 that the homing load is too high and/or too low. The sound transducer 212 may be disposed on a side of the fixture 101. In some embodiments, the sound transducer 212 may be disposed in the cuboid wall 240.

In some embodiments, the fixture 101 includes the communication interface 222. The communication interface 222 may include a wireline (e.g., copper wire, fiber optic cable, and the like) or wireless connection (e.g., RF coupling, IR coupling, data network communication (e.g., WiFi, WiMax, Bluetooth and the like). In some embodiments, the communication interface 222 may include a controller area network (CAN), although this is not intended to be limiting.

The processor 216 may communicate with the hoist motor controller 224 and/or the cockpit panel 226 by the communication interface 222. The communication interface 222 may include mechanical, electrical, or signaling circuitry for communicating data to and from a hoist motor controller 224 of the motor 112 and/or a cockpit panel 226 of the aircraft 104. The processors 216 may be configured to transmit a signal indicative of the force to the by way of the communication interface 222. The signal indicative of the force may be transmitted to the hoist motor controller 224 and/or the cockpit panel 226 for further processing, as will be described further herein. For example, the hoist motor controller 224 may control the motor 112 based on the force. By way of another example, the cockpit panel 226 may display the force on a display. The signal indicative of the force may then be used to help the hoist motor controller 224 and/or crew of the aircraft 104 to stop the hoist in the event of over tensioning, power the hoist in the event of loosening of the cable, and the like.

In some embodiments, the fixture 101 includes the power switch 214. The power switch 214 may include any type of power switch, such as, but not limited to, a push-button power switch, a toggle power switch, and the like. The power switch may also be referred to as a manual power on and off switch. The power switch 214 may control the power supplied from the power supply 220 to one or more components of the fixture 101, such as, but not limited to, the sensors 208, the lights 210, the sound transducer 212, the processor 216, the communication interface 222, and the like.

In some embodiments, the fixture 101 includes the power supply 220. The power supply 220 may supply power to one or more components of the fixture 101, such as, but not limited to, the sensors 208, the lights 210, the sound transducer 212, the processor 216, the communication interface 222, and the like. The power supply 220 may supply the power throughout the flight cycle of the aircraft 104. The various components may be powered to continuously monitor the homing load throughout the flight cycle. The ability to continuously monitor the homing load may be advantageous given that the power to the rescue hoist 102 may be shut off once the hook assembly 108 is homed. The processor 216 may continually detect the force to determine if there is any loosening of the cable 106. The power supply 220 may be referred to as an inbuilt power supply unit, a battery system, a port, and the like. In some embodiments, the power supply 220 may be a battery (e.g., a rechargeable battery). In some embodiments, the power supply 220 may be a dedicated supply from the aircraft. For example, the power supply 220 may include a power supply port. The power supply port may couple the fixture 101 to the aircraft power supply. In some embodiments, the power supply 220 may include a solar charger. The solar charger may supply the power directly to the various components and/or charge the battery.

Figure 3:
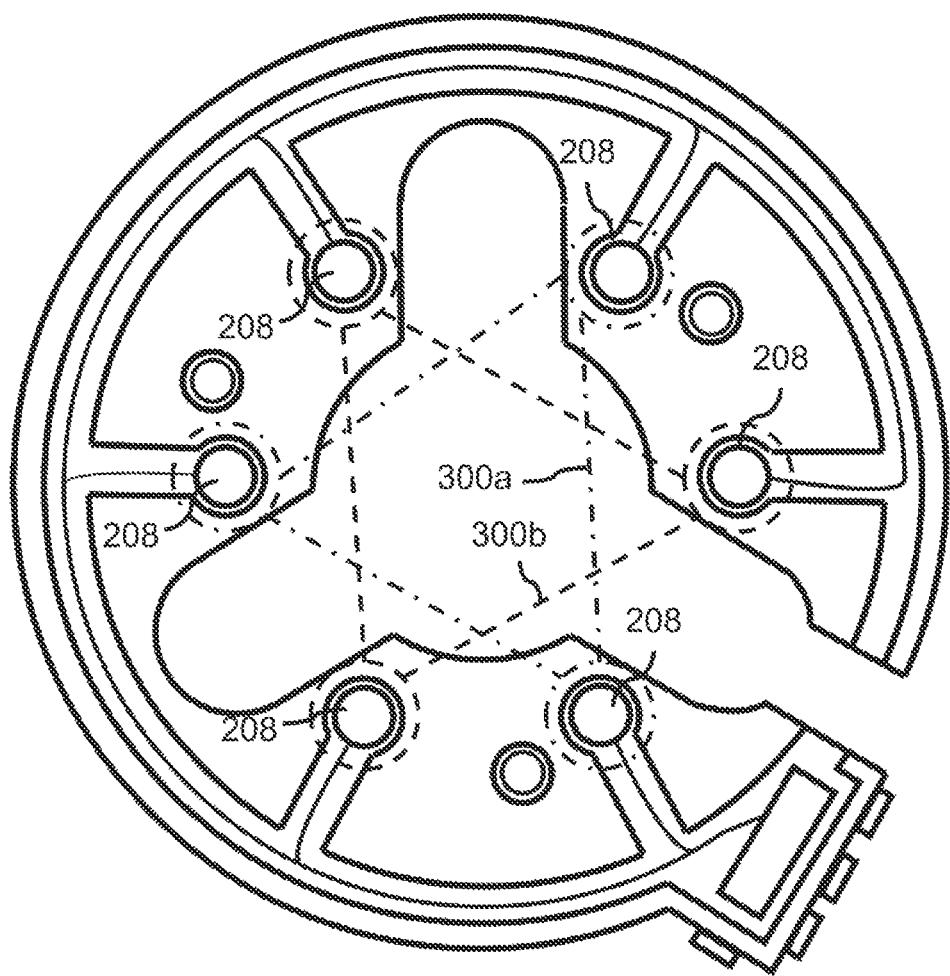
FIG. 3 depicts a first channel and a second channel of sensors of a fixture, in accordance with one or more embodiments of the present disclosure.

Referring now to FIG. 3, the sensors 208 of the fixture 101 are described, in accordance with one or more embodiments of the present disclosure. In some embodiments, the fixture 101 may be considered to include fault tolerance in the sensors 208. The fixture 101 may provide the fault tolerance by including a redundant number of the sensors 208. For example, the fixture 101 may include six of the sensors 208. As may be understood, the number of force sensors is not intended to be limiting and may be increased or decreased.

In some embodiments, the fixture 101 may provide the fault tolerance by including channels 300 of the sensors 208. The fixture 101 may include a first channel 300a and a second channel 300b. The first channel 300a may include three of the sensors 208. The sensors 208 in the first channel 300a may be arranged in a triangular pattern. The second channel 300b may include three of the sensors. The sensors 208 in the second channel 300b may be arranged in a triangular pattern. The arrangement of the sensors 208 in the first channel 300a and the second channel 300b may provide multiple force measurements around the through hole 228. The processor 216 may receive the signals indicative of the force measurements from both the first channel 300a and the second channel 300b. The processor 216 may then compares and validates the correctness of the force between the first channel 300a and the second channel 300b. For example, the processor 216 may validate the first channel 300a with the second channel 300b when the measurements are within a tolerance of each other. The processor 216 and engage the lights 210 and/or the sound transducer 212 when the first channel 300a is validated with the second channel 300b. The processor 216 may provide a warning indication to the cockpit panel 226 in response to detecting the first channel 300a is not validated with the second channel 300b.

Figure 4:
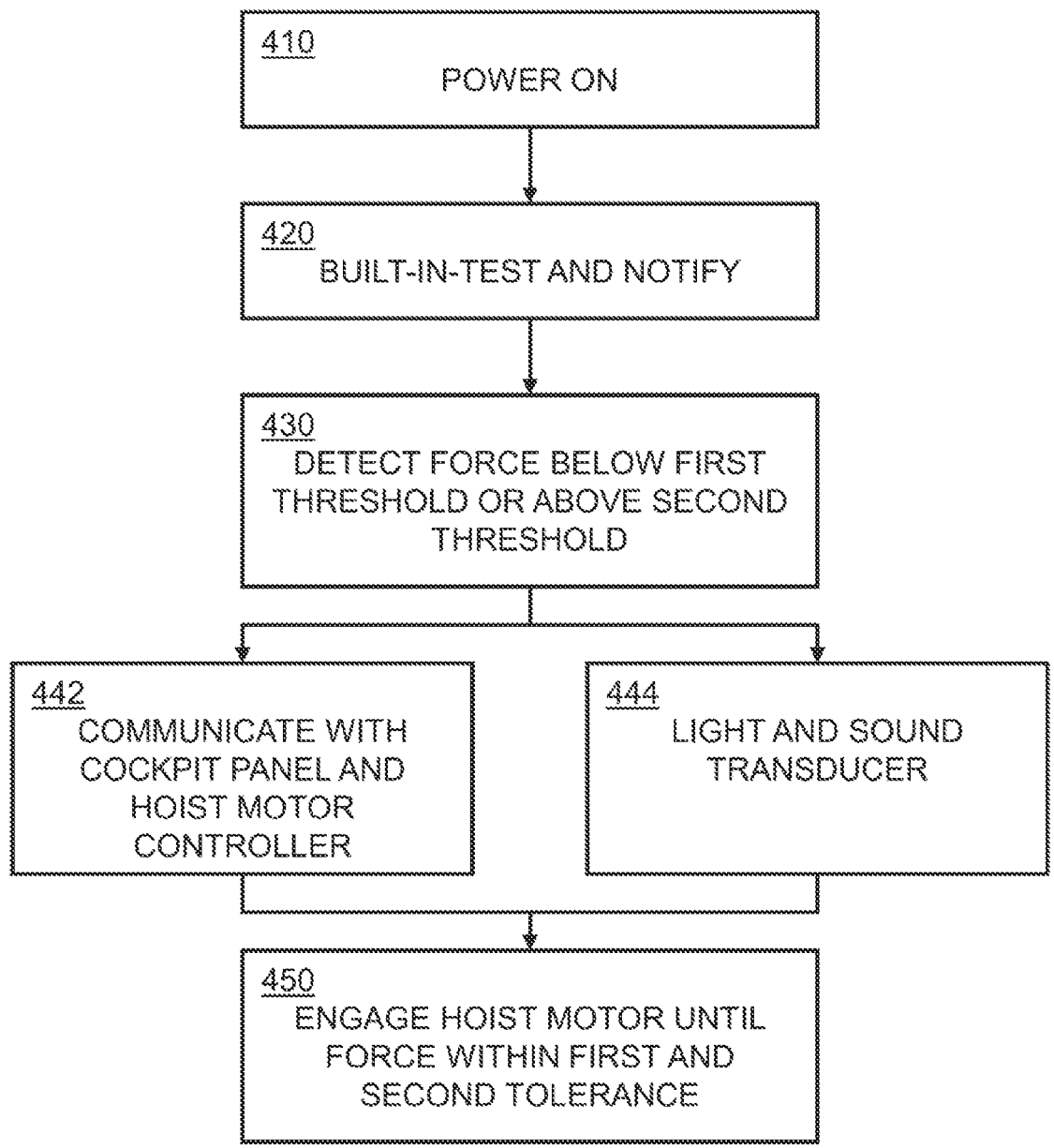
FIG. 4 depicts a flow diagram of a method, in accordance with one or more embodiments of the present disclosure.

Referring now to FIG. 4, a flow diagram of a method 400 is described, in accordance with one or more embodiments of the present disclosure. The method 400 may describe program instructions executable by the processor 216. The embodiments and enabling technology described in the context of the system 100, the fixture 101, the rescue hoist 102, and the aircraft 104 should be interpreted to extend to the method 400. It is further noted, however, that the method 400 is not limited to the architecture of the system 100, the fixture 101, the rescue hoist 102, and the aircraft 104.

In a step 410, a power on condition is detected. The power on condition may be detected when the power supply 220 begins supplying power to the processor 216 (e.g., when the power switch 214 is turned on).

In a step 420, a built-in-test (BIT) is performed. The built-in-test may also be referred to as a built-in-self test. The built-in-test may include monitoring the health of the sensors 208. The health of the sensors 208 may be monitored by comparing the signals indicative of the force from each of the channels 300. For example, the hook assembly 108 abuts the fixture 101. The built-in-test detects the hook assembly 108 abuts the fixture 101 by the sensor readings being above zero. If one sensor indicates a sensor reading of zero and the remaining sensors indicate a sensor reading above zero, the built-in-test may determine the one sensor is defective and ignore the readings from the one sensor in subsequent processing.

The step 420 may also include notifying the crew of the aircraft 104 about the status of the health of the sensors 208. For example, the processor 216 may communicate the health of the sensors to the cockpit panel 226. The cockpit panel 226 may then display the health of the sensors to the cockpit panel 226 (e.g., the one sensor is defective).

In a step 430, the processor 216 may detect the force received from the sensors 208 is one of below the first threshold or above the second threshold. For example, let "F" be the actual load (force) acting on the bell mouth when the hoist cable is fully reeled in; "X1" be the first threshold or the minimum required homing load; and "X2" may be the second threshold or the maximum required homing load. The processor may detect if F>X2 (too much homing load) and/or if F<X1 (too little homing load).

In a step 442, the processor 216 may communicate with the cockpit panel 226 and/or the hoist motor controller 224. The processor 216 may perform the communication in response to detecting the force is above or below the thresholds. The processor 216 may communicate the status of being below the first threshold or above the second threshold.

In a step 444, the processor 216 may engage the lights 210 and/or the sound transducer 212. The processor 216 may engage the lights 210 and/or the sound transducer 212 in response to detecting the force is above or below the thresholds. Engaging the lights 210 and/or the sound transducer 212 may then provide a visual and/or aural indication that the homing load is out of tolerance.

In a step 450, the motor 112 is engaged until the force detected by the sensors 208 is within the first tolerance and the second tolerance. Being within the first tolerance and the second tolerance may indicate the homing load is between the minimum and the maximum homing loads. In some embodiments, a crew of the aircraft 104 may manually engage the motor 112. In some embodiments, the hoist motor controller 224 may engage the motor 112 based on the signal received in the step 444. For example, the hoist motor controller 224 may implement a feedback loop using the signal.

The sensors 208 may continue sensing the force throughout the entire flight cycle (e.g., takeoff to touchdown). The steps 430-450 may then be repeated through the flight cycle. The fixture 101 may then be powered off.

Referring generally again to FIGS. 1A-4.

In some embodiments, the rescue hoist 102 may further include limit switches and/or hall effect sensors. The limit switches and/or hall effect sensors may generate one or more signals to aid in confirming if the hook assembly 108 abuts the fixture 101. The signals (ON or OFF condition) are taken by the processor and the status of the stowage of the cable 106 is display on a pendant screen. The limit switches and/or hall effect sensors may be used in combination with the force sensors, as the limit switches and/or hall effect sensors may be unable to determine the magnitude of force without the force sensors, such that the system is unable to determine if the cable is under or over tensioned.

The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A fixture comprising:
a surface;
a cylindrical wall extending from the surface; wherein the cylindrical wall is configured to receive at least a portion of a bell mouth of a rescue hoist;
a body portion extending from the surface and disposed within the cylindrical wall; and
a sensor configured to detect a force and generate a signal indicative of the force;
wherein the surface and the body portion define a through hole, the through hole concentric to an axis of the cylindrical wall;
wherein a cable of the rescue hoist is configured to extend through the through hole when the fixture is coupled to the bell mouth;
wherein the body portion abuts the bell mouth when the fixture is coupled to the bell mouth;
wherein the surface and the body portion define a first slotted through hole, a second slotted through hole, and a third slotted through hole;
wherein the first slotted through hole, the second slotted through hole, and the third slotted through hole each extend radially outward from the axis of the cylindrical wall;
wherein the first slotted through hole, the second slotted through hole, and the third slotted through hole are arranged at a one-hundred-and-twenty degree angle relative to each other; and
wherein the surface, the cylindrical wall, and the body portion define a rectangular slot from an outer diameter of the cylindrical wall up to the second slotted through hole.

2. The fixture of claim 1, wherein the fixture comprises a processor; wherein the processor is configured to receive the signal indicative of the force.

3. The fixture of claim 2, wherein the surface, the cylindrical wall, and the body portion define a groove; wherein the body portion defines a blind slotted hole extending radially outward from the sensor up to the groove; the fixture comprising one or more wires disposed within the blind slotted hole and the groove; wherein the one or more wires couple the sensor to the processor by which the processor is configured to receive the signal.

4. The fixture of claim 3, wherein the groove is disposed around an outer diameter of the body portion; wherein the sensor is a first sensor of a plurality of sensors; wherein the one or more wires are disposed in the groove.

5. The fixture of claim 4, wherein the plurality of sensors comprises a first set of three sensors in a first channel and a second set of three sensors in a second channel.

6. The fixture of claim 4, the processor is configured to monitor a health of the plurality of sensors.

7. The fixture of claim 3, wherein the body portion defines a counter bore; wherein the sensor is disposed within the counter bore.

8. The fixture of claim 2, wherein the fixture comprises a cuboid wall extending from the surface; wherein the processor is disposed in a recess defined by the cuboid wall.

9. The fixture of claim 2, wherein the fixture comprises at least one of a light or a sound transducer; wherein the processor is configured to detect the force is at least one of below a first threshold or above a second threshold based on the signal indicative of the force; wherein the processor is configured to engage at least one of the light or the sound transducer in response to detecting the force is at least one of below the first threshold or above the second threshold.

10. The fixture of claim 1, wherein the first slotted through hole, the second slotted through hole, and the third slotted through hole each include a length which is less than an outer radius of the body portion.

11. The fixture of claim 1, wherein the sensor comprises one of a load cell, a piezo-electric sensor, or a strain gauge.

12. The fixture of claim 1, wherein the fixture comprises a power supply and a power switch.

13. A rescue hoist comprising:
a motor configured to drive a cable drum of the rescue hoist;
a cable disposed on the cable drum, wherein an end of the cable extends through a bell mouth of the rescue hoist;
a hook assembly disposed on the end of the cable;
a fixture coupled to the bell mouth, wherein the hook assembly abuts the fixture when the hook assembly is in a homed position, the fixture comprising:
a surface;
a cylindrical wall extending from the surface, wherein at least a portion of the bell mouth is disposed within the cylindrical wall;
a body portion extending from the surface and disposed within the cylindrical wall,
wherein the bell mouth abuts the body portion; and
a sensor configured to detect a force between the bell mouth and the hook assembly and generate a signal indicative of the force;
wherein the surface and the body portion define a through hole, the through hole concentric to an axis of the cylindrical wall, wherein the cable extends through the through hole;
wherein the surface and the body portion define a first slotted through hole, a second slotted through hole, and a third slotted through hole;
wherein the first slotted through hole, the second slotted through hole, and the third slotted through hole each extend radially outward from the axis of the cylindrical wall;
wherein the first slotted through hole, the second slotted through hole, and the third slotted through hole are arranged at a one-hundred-and-twenty degree angle relative to each other; and
wherein the surface, the cylindrical wall, and the body portion define a rectangular slot from an outer diameter of the cylindrical wall up to the second slotted through hole.

14. The rescue hoist of claim 13, wherein the fixture comprises a communication interface, wherein the communication interface is configured to transmit the signal indicative of the force to a motor controller of the rescue hoist, wherein the motor controller is configured to engage the motor based on the signal indicative of the force to adjust the force.

15. The rescue hoist of claim 13, wherein the fixture comprises a processor; wherein the processor is configured to detect when the hook assembly abuts the fixture when the signal indicative of the force is greater than zero.

16. A system comprising:
an aircraft comprising a cockpit panel; and
a rescue hoist coupled to the aircraft, the rescue hoist comprising:
a motor configured to drive a cable drum of the rescue hoist;
a cable disposed on the cable drum, wherein an end of the cable extends through a bell mouth of the rescue hoist;
a hook assembly disposed on the end of the cable;
a fixture coupled to the bell mouth, wherein the hook assembly abuts the fixture when the hook assembly is in a homed position, the fixture comprising:
a surface;
a cylindrical wall extending from the surface, wherein at least a portion of the bell mouth is disposed within the cylindrical wall;
a body portion extending from the surface and disposed within the cylindrical wall, wherein the bell mouth abuts the body portion; and
a sensor configured to detect a force between the bell mouth and the hook assembly and generate a signal indicative of the force;
wherein the surface and the body portion define a through hole, the through hole concentric to an axis of the cylindrical wall, wherein the cable extends through the through hole,
wherein the surface and the body portion define a first slotted through hole, a second slotted through hole, and a third slotted through hole,
wherein the first slotted through hole, the second slotted through hole, and the third slotted through hole each extend radially outward from the axis of the cylindrical wall,
wherein the first slotted through hole, the second slotted through hole, and the third slotted through hole are arranged at a one-hundred-and-twenty degree angle relative to each other, and
wherein the surface, the cylindrical wall, and the body portion define a rectangular slot from an outer diameter of the cylindrical wall up to the second slotted through hole.

17. The system of claim 16 wherein the fixture comprises a communication interface, wherein the communication interface is configured to transmit the signal indicative of the force to the cockpit panel.

18. A fixture comprising:
a surface;
a cylindrical wall extending from the surface; wherein the cylindrical wall is configured to receive at least a portion of a bell mouth of a rescue hoist;
a body portion extending from the surface and disposed within the cylindrical wall;
a first sensor of a plurality of sensors, the first sensor configured to detect a force and generate a signal indicative of the force; and
one or more wires;
wherein the surface and the body portion define a through hole;
wherein a cable of the rescue hoist is configured to extend through the through hole when the fixture is coupled to the bell mouth;
wherein the body portion abuts the bell mouth when the fixture is coupled to the bell mouth;

wherein the surface, the cylindrical wall, and the body portion define a groove disposed around an outer diameter of the body portion;

wherein the body portion defines a blind slotted hole extending radially outward from the sensor up to the groove;

wherein the one or more wires are disposed within the groove; and wherein the one or more wires couple the sensor to the processor by which the processor is configured to receive the signal.

19. A rescue hoist comprising:

a motor configured to drive a cable drum of the rescue hoist;

a cable disposed on the cable drum, wherein an end of the cable extends through a bell mouth of the rescue hoist;

a hook assembly disposed on the end of the cable;

a fixture coupled to the bell mouth, wherein the hook assembly abuts the fixture when the hook assembly is in a homed position, the fixture comprising:

a surface;

a cylindrical wall extending from the surface, wherein at least a portion of the bell mouth is disposed within the cylindrical wall;

a body portion extending from the surface and disposed within the cylindrical wall, wherein the bell mouth abuts the body portion;

a first sensor of a plurality of sensors, the first sensor configured to detect a force between the bell mouth and the hook assembly and generate a signal indicative of the force; and one or more wires;

wherein the surface and the body portion define a through hole, wherein the cable extends through the through hole;

wherein the surface, the cylindrical wall, and the body portion define a groove disposed around an outer diameter of the body portion;

wherein the body portion defines a blind slotted hole extending radially outward from the sensor up to the groove;

wherein the one or more wires are disposed within the groove; and wherein the one or more wires couple the sensor to the processor by which the processor is configured to receive the signal.

20. A system comprising:

an aircraft comprising a cockpit panel; and a rescue hoist coupled to the aircraft, the rescue hoist comprising:

a motor configured to drive a cable drum of the rescue hoist;

a cable disposed on the cable drum, wherein an end of the cable extends through a bell mouth of the rescue hoist;

a hook assembly disposed on the end of the cable;

a fixture coupled to the bell mouth, wherein the hook assembly abuts the fixture when the hook assembly is in a homed position, the fixture comprising:

a surface;

a cylindrical wall extending from the surface, wherein at least a portion of the bell mouth is disposed within the cylindrical wall;

a body portion extending from the surface and disposed within the cylindrical wall, wherein the bell mouth abuts the body portion;

a first sensor of a plurality of sensors, the first sensor configured to detect a force between the bell mouth and the hook assembly and generate a signal indicative of the force; and one or more wires;

wherein the surface and the body portion define a through hole, wherein the cable extends through the through hole, wherein the surface, the cylindrical wall, and the body portion define a groove, wherein the body portion defines a blind slotted hole extending radially outward from the sensor up to the groove, wherein the one or more wires are disposed within the blind slotted hole and the groove, wherein the one or more wires couple the sensor to the processor by which the processor is configured to receive the signal, and wherein the groove is disposed around an outer diameter of the body portion;

wherein the sensor is a first sensor of a plurality of sensors; wherein the one or more wires are disposed in the groove.

* * * * *